United States Patent [19]

Kancler

[11] 4,099,229
[45] Jul. 4, 1978

[54] VARIABLE ARCHITECTURE DIGITAL COMPUTER

[75] Inventor: H. Clifford Kancler, Los Altos Hills, Calif.

[73] Assignee: The United States of America as represented by the Secretary of the Navy, Washington, D.C.

[21] Appl. No.: 768,445

[22] Filed: Feb. 14, 1977

[51] Int. Cl.² .................. G06F 9/16; G06F 13/00; G06F 3/00; G06F 1/00
[52] U.S. Cl. ........................................ 364/200
[58] Field of Search ... 364/200 MS File, 900 MS File

[56] References Cited

U.S. PATENT DOCUMENTS

3,978,456   8/1976   Moran .................. 364/200

Primary Examiner—James D. Thomas
Attorney, Agent, or Firm—R. S. Sciascia; Charles D. B. Curry; Francis I. Gray

[57] ABSTRACT

A variable architecture digital computer to provide real-time control computations a for missile by executing efficient variable-length instructions optimized for such application by means of a microprogrammed processor and an instruction byte string concept.

8 Claims, 10 Drawing Figures

FIG _ 1

FIG_3

FIG_4

FIG_5

FIG_6

FIG_7

FIG_8

FIG_9

FIG. 10

VARIABLE ARCHITECTURE DIGITAL COMPUTER

BACKGROUND OF THE INVENTION

1. Field of the Invention

The present invention relates to digital computers, and more particularly to an aerospace computer for missile control having a microprogrammed processor.

2. Description of the Prior Art.

The concept of microprogramming was first introduced by M. V. Wilkes, "The Best Way to Design an Automatic Calculating Machine", Report of Manchester University Computer Inaugural Conference (July 1951), as a systematic way of designing the control section of a digital computer. His approach consists of providing the control section with an autonomous read only storage. Each time a program instruction begins, the control unit generates an address to its read only storage derived from the operation code (opcode) of the instruction. This location provides the first of a series of words which supply the control signals to the computer for carrying out the particular instruction being processed. Each instruction in effect generates a transfer to a microsubroutine associated with it, and the resultant step by step operation of the machine corresponds to the execution of a program on a very detailed level (thus the term microprogram).

These proposals were not widely implemented at the time of Wilkes'initial work in the early 1950's due to hardware limitations. However, the present availability of integrated circuit read only memories has made the construction of a microprogrammed computer feasible.

Additionally, a computer memory provides the largest hardware cost in a computer. Therefore, the key to hardware speed and minimum size lies in efficient use of the memory. Fixed instruction length computers require the same number of bits per each instruction word regardless of the simplicity or complexity of the operation to be executed. As an example, many bits can be wasted in instructions which specify simple operations, while many instructions can be wasted in complex operations where an instruction's capability is limited by its length.

Also, computers are designed according to one of three architectures: accumulative, list processor or general register. Except for special applications, the general register computer yields the most efficient use of memory. For most efficient operation it is desired to design a computer which can perform all applications most efficiently.

SUMMARY OF THE INVENTION

Accordingly, the present invention provides a variable architecture digital computer using a number of interlocking concepts resulting in an architecture more efficient than architectures currently employed. The general register concept provides a locality of data, the locality being referenced by a single address byte rather than a global address. With the register byte address mapped into a portion of the memory, the hardware registers do not need relevant program data, i.e., they are used for their ample processing capability for more sophisticated input/output mechanizations between instructions. Thus, input/output is memory oriented relieving an instruction set for the computer of the need for input/output instructions. The input/output is, therefore, independently designed to meet the real-time needs and particular formats of the external interfaces independent of the instruction set.

The instruction set is of variable-length and is optimized to most efficiently solve the computational problem presented in two ways. First, the amount of information contained in an instruction is proportional to the complexity of the instruction with the shortest formats being given to the most frequently executed instructions to save execution time. Secondly, with a microprogram control mechanism and flexible instruction formatting, only instructions required by the particular computational application are provided by accessing appropriate microroutines, saving memory space as a result.

A read only microprogram memory with associated microinstruction register drives medium scale devices such as multiplexers and has a word wide enough to allow considerable parallel activity. A program memory provides variable-length instructions composed of strings of 4-bit bytes to an instruction register which can shift left in byte increments. A processor performs arithmetic or logical operations under control of the microroutine called by the opcode of the instruction, and uses general registers in a data memory as sources and destinations for operands referenced by the arithmetic or logical operations and also as index registers and memory pointers.

A sequencer provides for succeeding microprogram addresses under control of the microgram itself once a microprogram has been accessed by the opcode of an instruction. The input/output function is memory oriented and operated under the control of the microprogram on an interrupt basis at the conclusion of processing of an instruction.

For a specific missile real-time control application the computer receives serial digital attitude and time information from a guidance computer and rate gyro information from analog-to-digital (A-D) converters and provides serial digital data to a number of packages, parallel information to high rate packages and analog information to various servos.

STATEMENT OF THE OBJECTS OF THE INVENTION

Therefore, an object of the present invention is to provide a flexible digital computer for missile flight control application.

Another object of the present invention is to provide a microprogrammed processor that executes variable-length instructions.

A further object of the present invention is to provide an input/output function independent of the user program.

Yet another object of the present invention is to provide realtime microdiagnostic testing.

Other objects, advantages and novel features of the invention will become apparent from the following detailed description of the invention when considered in conjunction with the accompanying drawing wherein:

DESCRIPTION OF THE PREFERRED EMBODIMENT

Figure 1:
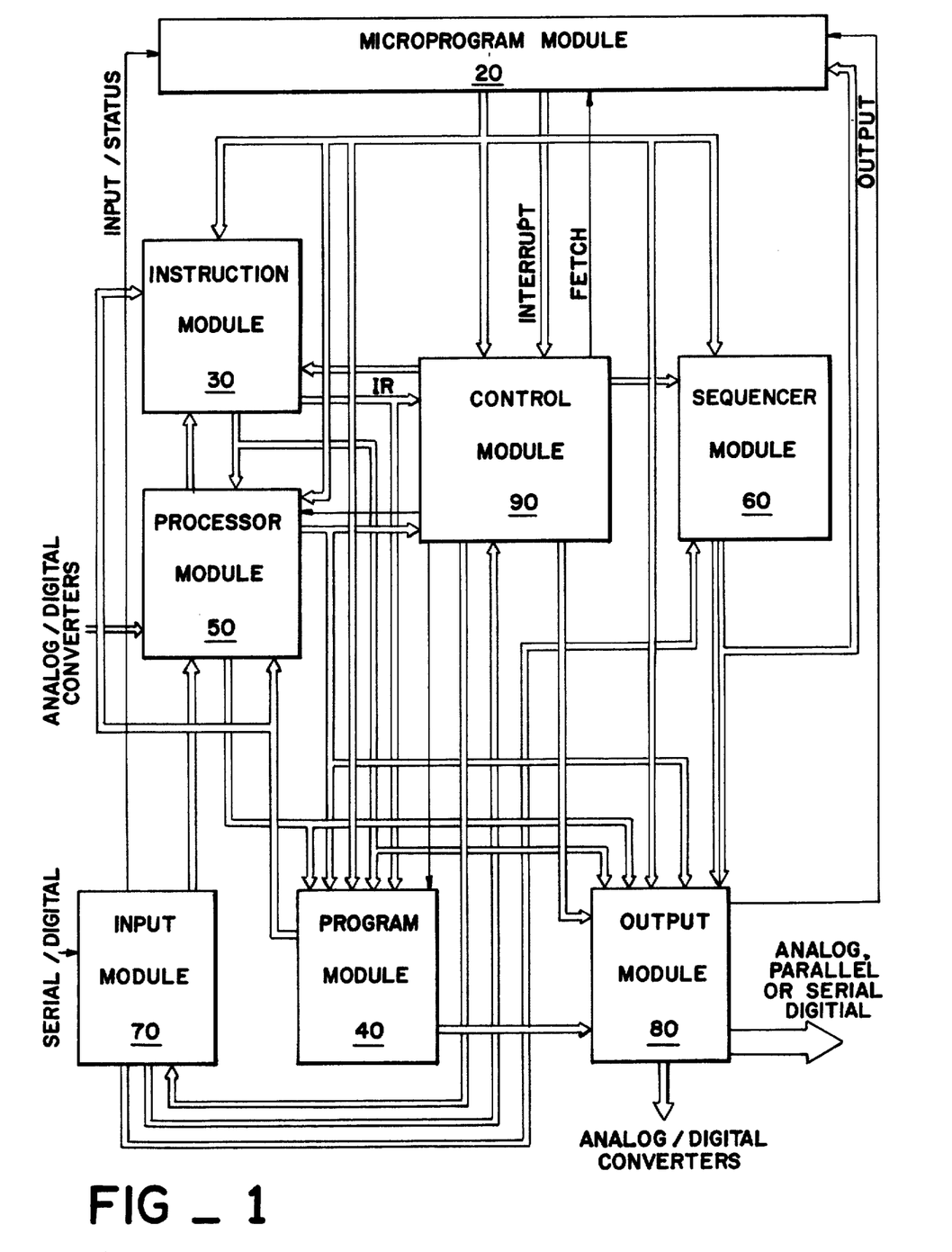
FIG. 1 is a block diagram of a computer according to the present invention.

Referring now to FIG. 1 a microprogram module 20 has a microprogram read only memory (ROM), a microinstruction register and a priority logic circuit. When a microprogram word is addressed, the word is read from the microprogram ROM into the microinstruction register. This register supplies control signals and a numeric literal field which is used by the digital computer for a variety of addressing and indexing operations as well as for arithmetic operations.

An instruction module 30 has an instruction register which can shift its contents to the left in one or three 4-bit byte increments. This shifting property accomodates variable length instructions which may be packed several instructions per word and may be split across the bounderies of adjacent words. The contents of the instruction register come from a user program. Separate instructions are accessed and their field format determined by a microprogram in the microprogram ROM, while the boundaries of the instruction words and the fetching of new words is kept track of by a byte counter.

A program module 40 has a memory which is divided into two sections. The user program resides in a ROM, and a read/write (data) memory contains space for input/output buffers, subroutine linkage stack and the general registers.

A processor module 50 has a register file and an arithmetic logic unit (ALU) which can perform a variety of arithmetic and logic operations. Operands for the various operations are read by the microprogram from the program module 40 into the register file (which cannot be directly accessed by the user program) and are processed by the ALU. Results may be written back into the program module 40. Memory addresses for the program module 40 may come from the processor module 50 and from the instruction module 30.

A sequencer module 60 controls access to the microprogram ROM in the microprogram module 20. For a given macroinstruction (user program instruction) the first microprogram ROM address is determined from the opcode of the instruction word presently in the instruction register. Succeeding microprogram ROM addresses are under the control of the microprogram itself. This module also contains hardware to generate addresses for input/output (I/O) and realtime microdiagnostic operations.

Data is acquired by the computer via an input module 70 for serial digital data, and via analog to digital converters for analog data to provide parallel digital data to the processor module 50. The input module 70 has an input register acting as a shift register which is filled serially, which operation is asynchronous with respect to the computer program execution. Input data is entered in parallel from the most significant bits of the input shift register of the input module 70, or from the converted analog data, via the processor module 50 to an input buffer in the data memory of the program module 40 on an interrupt basis at the completion of an instruction execution of the user program. Later, the input data is transferred from the input buffer to other locations in the data memory via the processor module 50 under program control.

Output data from the output module 80 may be in three forms. Data to missile servos is converted from digital to analog by a digital-analog converter (DAC). A serial digital output is obtained by converting from parallel to serial by an output shift register. The third form of data is kept in parallel for high rate requirements, and is transmitted via a buffering register. The allocation of output buffers in the data memory of the program module 40 is made by the programmer and is not restricted to any particular area in the data memory.

The control module 90 contains the hardware to perform several distinct and unrelated functions. A demultiplexer decodes a microorder control field in the microprogram instruction to provide infrequently used, mutually exclusive control signals. Two groups of logic in the control module use "internal conditions" as inputs. The first of these groups is used to shift bits in a multiplier during multiplication, the control being derived from the demultiplexer. The second group ORs part of a data, or literal, field of the microinstruction with either the most significant byte from the instruction register of the instruction module 30 or certain internal conditions derived from the microinstruction of the microprogram module 20. This second group outputs to the sequencer module 60 to select the next microprogram address. A byte counter and associated control logic are used in the loading of the instruction register and in the transfer of data from the input module 70 to locations in the input buffer.

Referring now to FIGS. 2–9, a detailed description of a specific embodiment is described. The microprogram module 20, shown in FIG. 2, has a read only memory (ROM) 22 with 512 48-bit words, the output of which is loaded into a microinstruction register 24, and provides internal control signals for the computer. As shown, the microinstruction register 24 may be divided into functional fields, with each field corresponding to a specific control function. Each microinstruction is encoded only to the level where it can drive medium scale devices such as multiplexers, consequently it is wide enough (48 bits) to allow considerable parallel operation.

Figure 2:
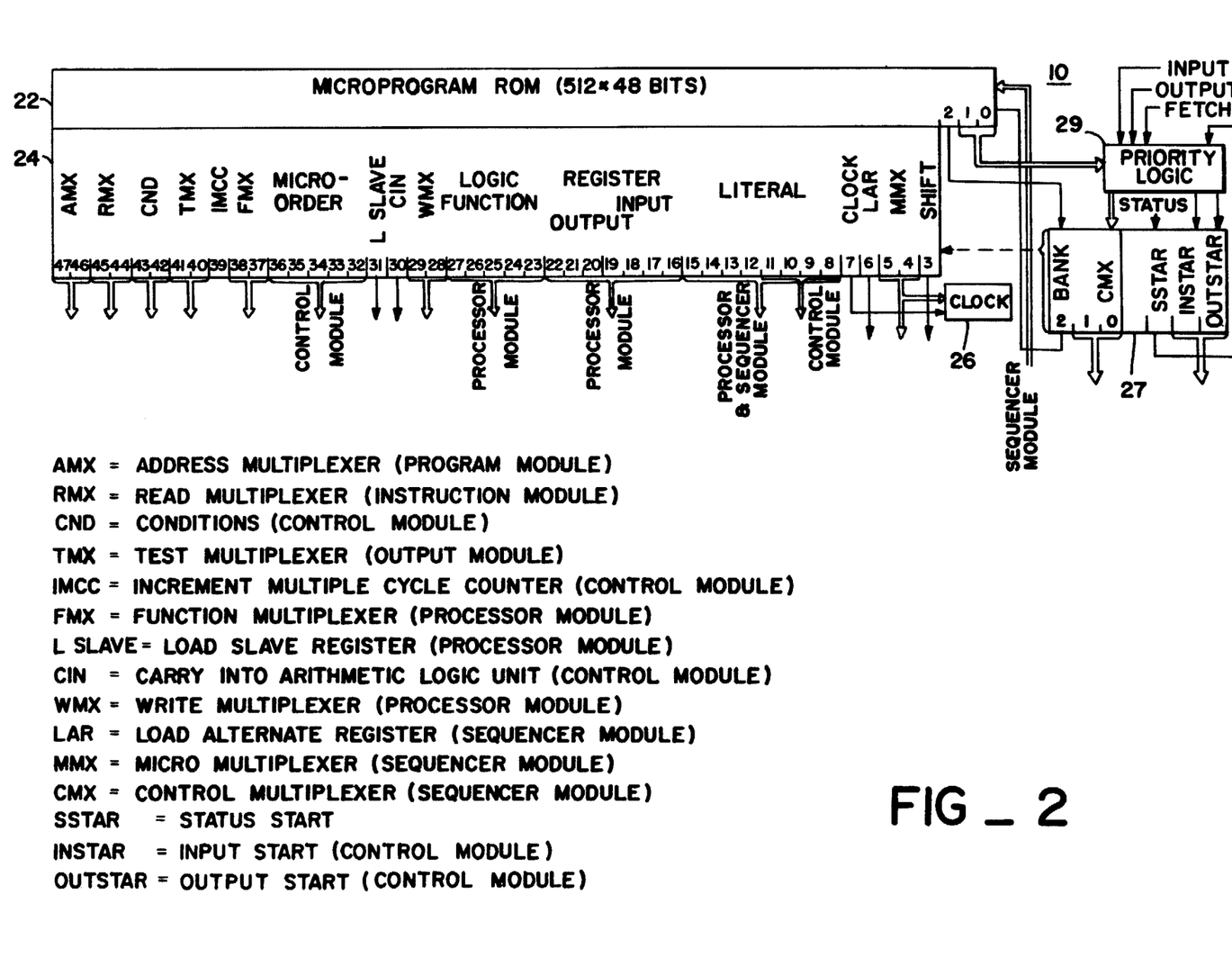
FIG. 2 is a block diagram of the microprogram module of the computer.

Fourteen bits of the microinstruction register 24 from the multiplexer control field is broken down into seven 2-bit fields — AMX, RMX, TMX, FMX, WMX, MMX, and CMX. Each of these fields supplies an address to a single data multiplexer. These multiplexers will be discussed in detail along with the computer module in which they appear.

The remainder of the microinstruction register 24 is comprised of several fields whose functions will now be summarized and will be discussed in greater detail along with the computer module in which they appear. CND selects internal combustion for use by the control module 90 for input to the sequencer module 60 is generating microaddresses. IMCC increments a multiple cycle counter in the control module 90 which is used in operations requiring repetition of a set of microinstructions such as shifting or multiplying. The microorder control field supplies addresses to the demultiplexer in the control module 90 and thereby controls various micro-operations within the computer. L SLAVE causes the loading of a slave register in the processor module 50. CIN provides a carry into the least significant bit of the ALU in the processor module 50 via logic in the control module 90. The LOGIC/FUNCTION field tells the ALU what operation to perform on the operands supplied to it. The REGISTER INPUT/OUTPUT field contains the addresses of register files in the processor module 50 to be written into and read from respectively. The LITERAL field, along with its associated sign bit from the micro-order demultiplexer, supplies a literal which may be used by various parts of the computer in operations such as address modification. CLOCK, when enabled, in conjunction with MMX reduces the rate of the system clock 26, such as from 300 nsec clock pulses to 400 or 500 nsec clock pulses per microroutine, so that operations which encounter extensive logic delays within the computer may be used. LAR enables loading of one of two registers in the sequencer module 60. SHIFT controls the shifting and loading via the byte counter in the control module 90 of the instruction register in the instruction module 30.

The three least significant bits of the microinstruction from the microprogram ROM 22 are unique in that they are not buffered through the microinstruction register 24, but are applied to combinational logic directly. This is done so that the next user program instruction may be fetched immediately, rather than waiting for the clock pulse which loads the microinstruction register 24 and initiates decoding of the microinstruction. The remainder of the microprogram module will be described subsequently.

Figure 3:
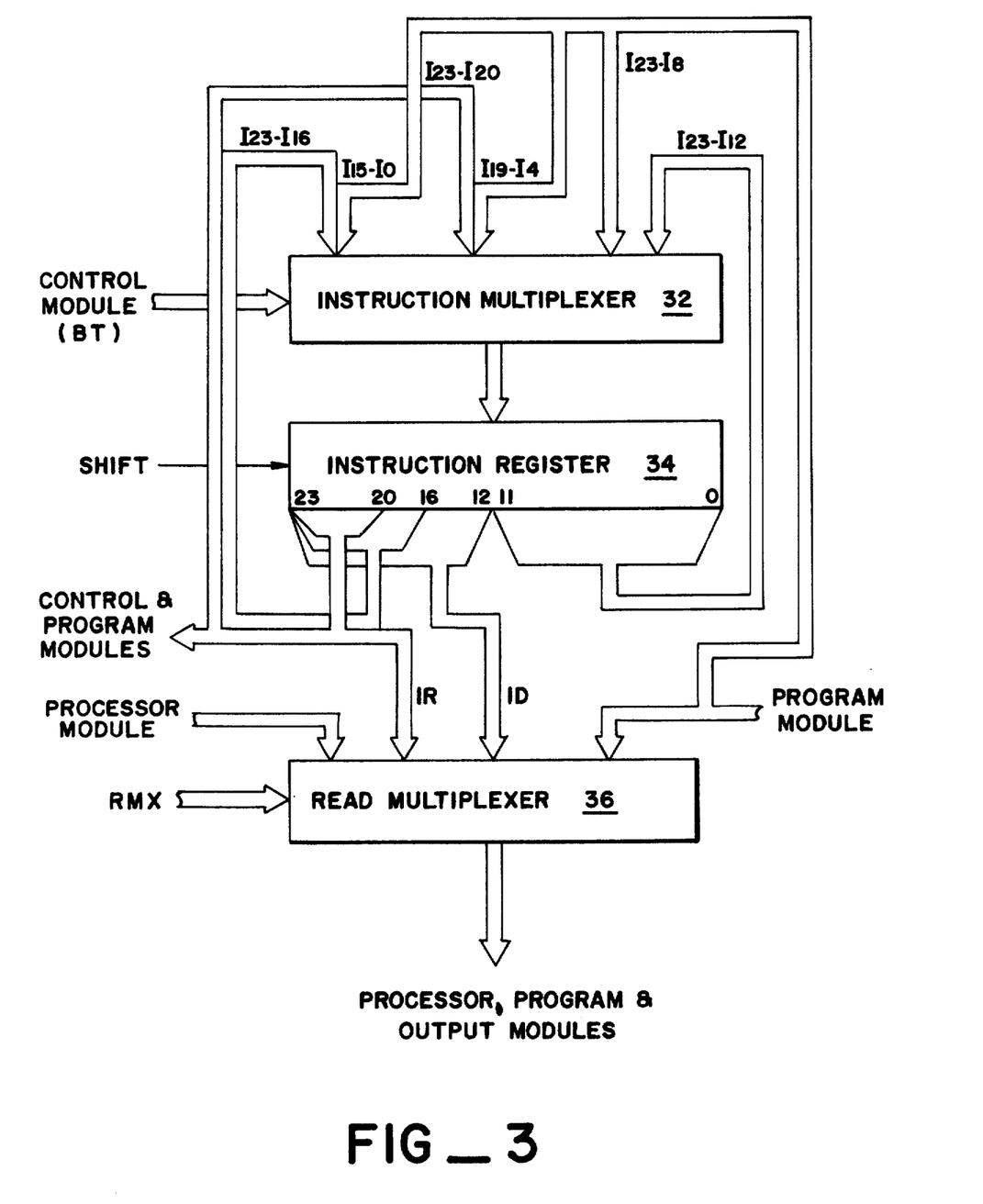
FIG. 3 is a block diagram of the instruction module of the computer.

Referring now to FIG. 3, the instruction module 30 has an instruction multiplexer 32 with four inputs which loads an instruction register 34 in parallel. The inputs to the instruction multiplexer 32 are various concatenations of bytes presently in the instruction register with bytes of a user program instruction from the program module 40. Going from most significant to least significant bytes, assuming that the instruction multiplexer 32 and the instruction register 34 are 24 bits wide and that the user program instruction is 16 bits long, these inputs are: (1) the two most significant bytes from the instruction register followed by the presently addressed user program instruction from the program module 40, (2) the most significant byte in the instruction register followed by the presently addressed user program instruction from the program module, (3) the present addressed user program instruction from program module, and (4) the previous contents of the lower three bytes of the instruction register which are now placed in the upper three bytes (shift left 3). The particular input selected is determined by the byte counter (BT) from the control module 90 which keeps track of the number of shifts of the instruction register 34 by counting the number of empty least significant bytes, i.e., bytes devoid of information supplied by the user program. The inputs are loaded into the most significant bytes of the instruction register 34, and, since the instruction register is not entirely filled by all the given inputs, the remaining insignificant bytes are empty. By shifting continuously and loading in this manner the instruction register 34 supplies an apparently endless string of bytes to the microprogram.

The instruction in the instruction register 34 is broken down into its component fields (opcode, addresses, etc.) by analyzing the high order byte or bytes in the register, then left-shifting the contents of the register in one or three byte increments until the next field is placed in the most significant position of the register. Each field may be isolated and read out from the instruction register 34 by a read multiplexer 36 which can select the most significant byte (IR) or the three most significant bytes (ID). The particular input to the read multiplexer 36 is determined by the RMX field from the microinstruction register 24. The other two inputs to the read multipler 36 are the output from a slave register in the processor module 50 and data from the program module 40. The latter input gives the read multiplexer 36 its name since it is used to access data from the program module 40 that is required by the rest of the computer. The output of the read multiplexer 36 is connected to the input of the processor module 50, the output module 80 and the program module 40.

Figure 4:
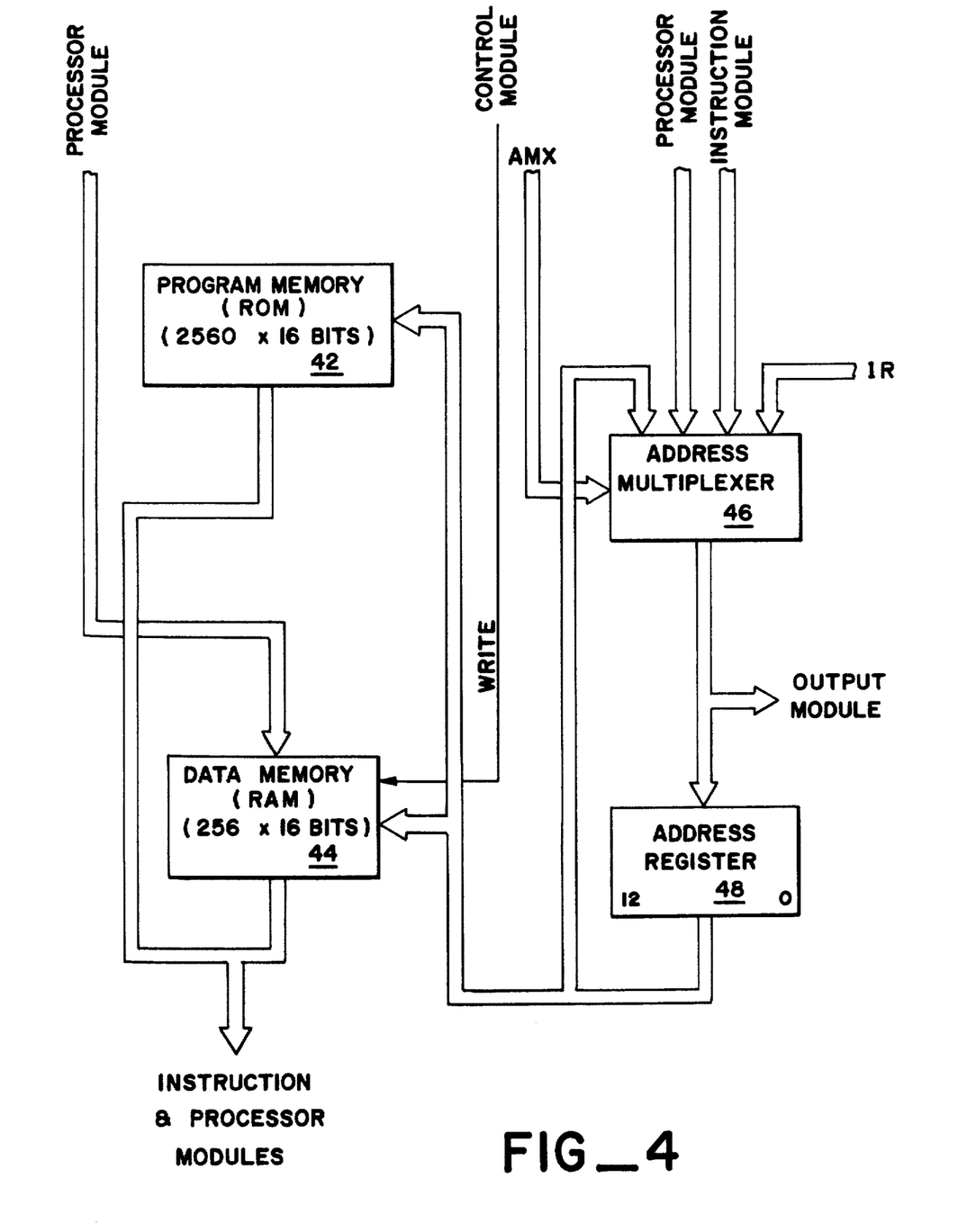
FIG. 4 is a block diagram of the program module of the computer.

FIG. 4 shows the program module 40 which has a program memory 42 (read only memory) in which the user program is stored and a data memory 44 (read/write memory) which contains the general registers and the input/output buffers. The program memory 42 is the source of user program instructions for the instruction module 30, and the data memory 44 is the source of data for the processor module as well as data for output via the read multiplexer 36 of the instruction module 30. A WRITE signal, decoded from the MICRO-ORDER field of the microinstruction register 24 by the control module 90, enables the data memory 44 to receive data from the processor module 50.

An address multiplexer 46 is controlled by the AMX field of the microinstruction register 24 and connects directly to an address register 48. Address source are from the address register 48 itself (in lieu of a disable signal for the loading of the address register), the processor module 50, the read multiplexer 36 of the instruction module 30, and IR from the instruction register 34 of the instruction module. The output of the address register 48 is connected directly to the address inputs of the program memory 42 and the data memory 44. The output of the address multiplexer 46 also connects with the input of the output module 80. For a total memory of 2,816 words, a 12-bit address register is required.

Figure 5:
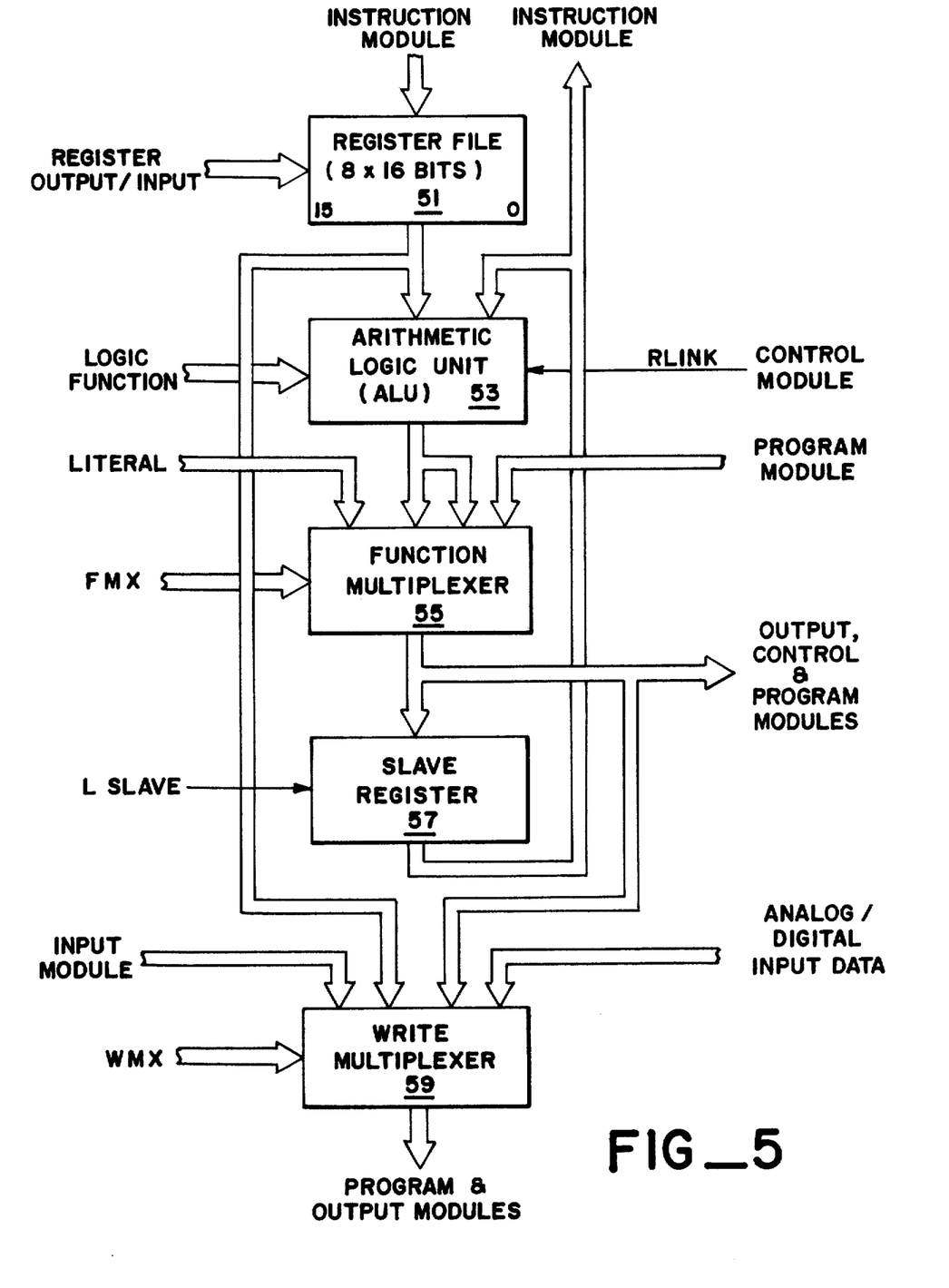
FIG. 5 is a block diagram of the processor module of the computer.

The processor module 50, shown in FIG. 5, has a register file 51 with a plurality of registers which are addressed by the REGISTER OUTPUT/INPUT field of the microinstruction register 24. The register file 51 may be simultaneously written into and read out from different addresses. The register file 51 provides one operand to an arithmetic logic unit (ALU) 53. The ALU 53 may perform a large number of operations using two operands. These operations include addition, subtraction, left-shifting, incrementing, and logical ANDing and ORing. The particular operation is chosen by the LOGIC/FUNCTION field of the microinstruction register 24. The second operand is the present contents of a slave register 57.

A function multiplexer 55 has four inputs controlled by the FMX field of the microinstruction register 24. One of the inputs is the LITERAL field of the microinstruction register 24, the second input is the presently addressed contents of the data memory 44, and the last two inputs select the output of the ALU 53 directly or right-shifted. The output of the function multiplexer 55 is connected to the slave register 57, the multiple cycle counter in the control module 90, the address multiplexer 46 of the program module 40, a write multiplexer 59, and the output module 80.

The slave register 49 is used by the microprogram as an accumulator register. The L SLAVE field of the microinstruction register 24 enables the loading of this register by the function multiplexer 55. The slave register 59 may be shifted left one bit by adding it to itself via the ALU 53, and new bits may be entered serially under control of CIN which allows a carrying (RLINK) by the ALU.

The write multiplexer 59 selects the source of all input to the data memory 44, as well as making the selected data available to the output module 80, depending upon the WMX field of the microinstruction register 24. The inputs are: (1) the most significant bits of the input data from the input module 70, (2) the output of the register file 51, (3) the output of the function multiplexer 55, or (4) the output of one of a plurality of analog to digital converters. The selected data is written into the area of the data memory 44 presently addressed by the address register 48 if the WRITE signal is present.

Figure 6:
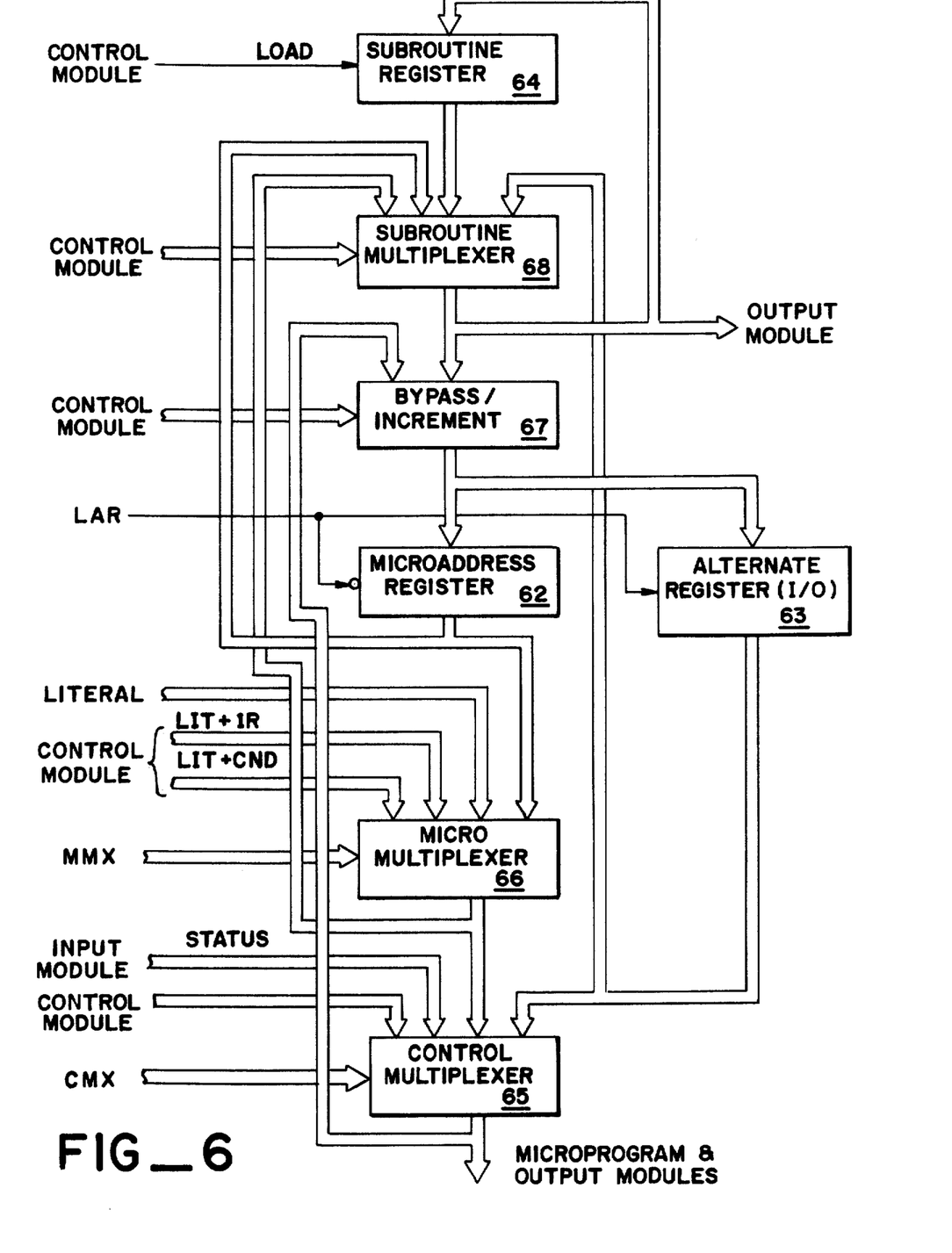
FIG. 6 is a block diagram of the sequencer module of the computer.

Referring now to FIG. 6, the sequencer module 60 contains the logic that controls microinstruction sequencing. A microaddress register (MAR) 62 is the source of microaddresses for executing instructions, an alternate register (AR) 63 is the source of microaddresses for executing input/output (I/O), and a subroutine register 64 establishes a hierarchy for using microsubroutines. Microprograms can be two levels deep in executing user program instructions and one level deep in I/O. The microprogram ROM 22 addresses are output from the sequencer module by a control multiplexer 65. The control multiplexer 65 by itself accesses only one-half of the microprogram ROM 22, so a ninth address bit is supplied by a BANK bit from the combinational logic 27 in the microprogram module 20 to control access to either half of the microprogram ROM.

The control multiplexer 65 is the only multiplexer in the computer whose input select signals are derived in part from external conditions. The selection is determined by CMX which is generated by the microprogram in conjunction with a priority logic 29 in the microprogram module 20 (see FIG. 2). The input to the control multiplexer 65 from a micromultiplexer 66 is selected when the computer is executing a user program. When an I/O interrupt is processed, the microprogram selects the alternate register 63 which becomes the microprogram address source for the I/O routine. The address for an interrupted program is saved pending resumption of the interrupted program in the microaddress register 62 which is not used by the I/O routine.

As the instruction register 34 of the instruction module 30 is emptied, program execution must be temporarily suspended at some time while a new instruction is "fetched" from the program memory 42. This is done by selecting the control module 90 input to the control multiplexer 65 for one instruction cycle which results in a hard wired branch to a location in the microprogram ROM 22 containing a routine for fetching bytes from the program memory 42 and placing them in the vacated positions in the instruction register 34. This microroutine also saves the contents of the microaddress register 62 and the slave register 57 in the processor module 50 so that program execution may be resumed after the fetch cycle is complete.

The remaining input to the control multiplexer 65 is provided by a status word which is part of the data input to the input module 70. The status word appears periodically and creates a real-time jammed interrupt to start the user program. This word specifies one of a plurality of microdiagnostic programs which runs just prior to the user program and supplies a hardware test result to the output module 80. At the time of this interrupt, the microprogram module 20, the instruction module 30, the processor module 50, the sequencer module 60 and the control module 90 are devoid of information relevant to the program state, this information existing entirely in the program module 40. Thus, these modules are available for fault testing with the microdiagnostic routines. Since the memory oriented architecture implies that these modules are also responsible for the logical functioning of much of the I/O processing (in a time sharing sense), a great deal of information is available which would otherwise be unobtainable during actual computational processing, i.e., during a missile flight, for example. A key feature of the microdiagnostic routines is that they are executed in real-time while a mission is in progress, thus providing logical fault data about the computer while in flight.

The inputs to the micromultiplexer 66 are selected by the MMX field of the microinstruction register 24. The inputs are: (1) the LITERAL from the microinstruction register 24, (2) IR φRed in the control module 90 with the least significant byte of the LITERAL (LIT + IR), (3) the output of condition logic in the control module 90, which is determined by the CND field of the microinstruction register 24, φRed with the least significant bits of the LITERAL (LIT + CND), and (4) the output of the miocroaddress register 62.

The microaddress and alternate registers 62, 63 are both loaded from a bypass/increment logic 67, and the LAR field of the microinstruction register 24 and its logical inverse (LMAR) enable the loading of one or the other of these registers. The bypass/increment logic 67 is an arithmetic unit which uses the outputs of the control multiplexer 65 and a subroutine multiplexer 68 as index arguments and updates the microaddress value for each microinstruction cycle of the computer. The address generated by the bypass/increment logic 67 depends on the "fetch" status and the MICRO-ORDER field of the microinstruction register 24. During interrupt operations the control module 90 places the bypass/increment logic 67 in the "bypass" mode.

During program execution LAR and LMAR cause the value of either the microaddress register 62 or the alternate register 63 to be incremented by one and used as the next microprogram address (branching within the microprogram being accomplished by the micromultiplexer 66 using the LITERAL field as mentioned previously).

The subroutine multiplexer 68 and subroutine register 64 are used by the microprogram to enter and leave microsubroutines. The subroutine multiplexer 68 allows the present microaddress to be stored in the subroutine register 64 and later restored to the microaddress register 62 or alternate register 63 when the microsubroutine is exited. The subroutine multiplexer 68 output drives both the subroutine register 64 and the bypass/increment logic 67. Access to the subroutine register 64 is via the subroutine multiplexer 68 controlled by the MICRO-ORDER field of the microinstruction register 24 via the control module 90 which provides the following operations: load subroutine register with contents of microaddress register 62, load with contents of alternate register 63, and read subroutine register. The destination register in the latter operation is either the microaddress register 62 or alternate register 63 depending upon LAR/LMAR. The remaining input to the subroutine multiplexer 68 is the output of the microaddress multiplexer 66.

Figure 7:
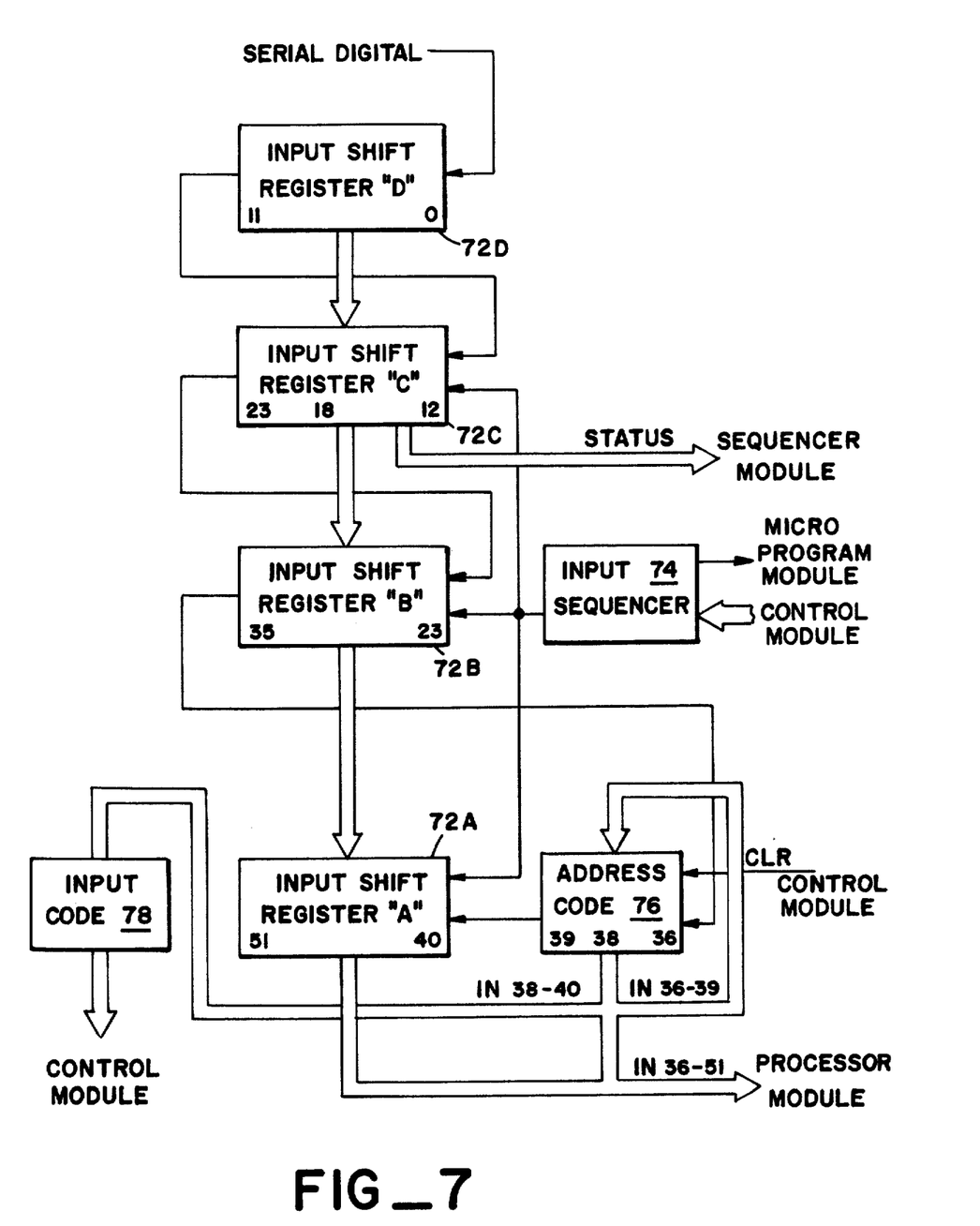
FIG. 7 is a block diagram of the input module for the computer.

The input module 70 is composed of a set of input shift registers 72A, 72B, 72C, 72D as shown in FIG. 7. Input is received serially and is shifted in until the registers are full, at which point an input interrupt is generated by an input sequencer 74 and sent to the microprogram module 20. The least significant bit of register 72A in conjunction with an address code register 76 are placed into an input code register 78 and indicate what kind of data has been received. This information is used by the control module 90 to generate the microaddress of an input handling routine. The input data is divided into a plurality of words, such as four 12-bit words as illustrated, which are placed in the data memory 44 of the program module 40 by the write multiplexer 59 of the processor module 50 through successive shits in parallel of the contents of registers 72B, 72C, 72D, into register 72A. After the first such shift the contents of register 72B have replaced those of register 72A, the contents of register 72C are in register 72B, etc. The data words, ie., the contents of registers 72B, 72C, 72D, are read into an input buffer set up by the microprogram in the data memory 44 from register 72A, one after each shifting process. The microprogram adds the address code register 76 to the base address determined by the type of data to tell the computer where the data goes into data memory 44.

All input data is read into a portion of an input array section of the data memory 44, the exact location used being a function of the kind of data as indicated by the input code and address code registers 78, 76. The user program must then move the data to a different location in the data memory 44 before the next set of input data is received or the data will be lost.

Another feature of the input register structure is that it allows extra buffering so that serial data words may be accepted more rapidly. As soon as the data words have been shifted in parallel once, register 72D may accept data in serial independently while the other registers 72C, 72B, 72A are supplying data to the data memory 44 in parallel mode. The input sequencer 74 controls this operation and clears registers 72A, 72B, 72C at the conclusion of the input interrupt.

If the input data word is a microdiagnostic word, a portion of register 72C is input to the control multiplexer 65 of the sequencer module 60 to select the microaddress of the particular one of a plurality of microdiagnostics specified.

Figure 8:
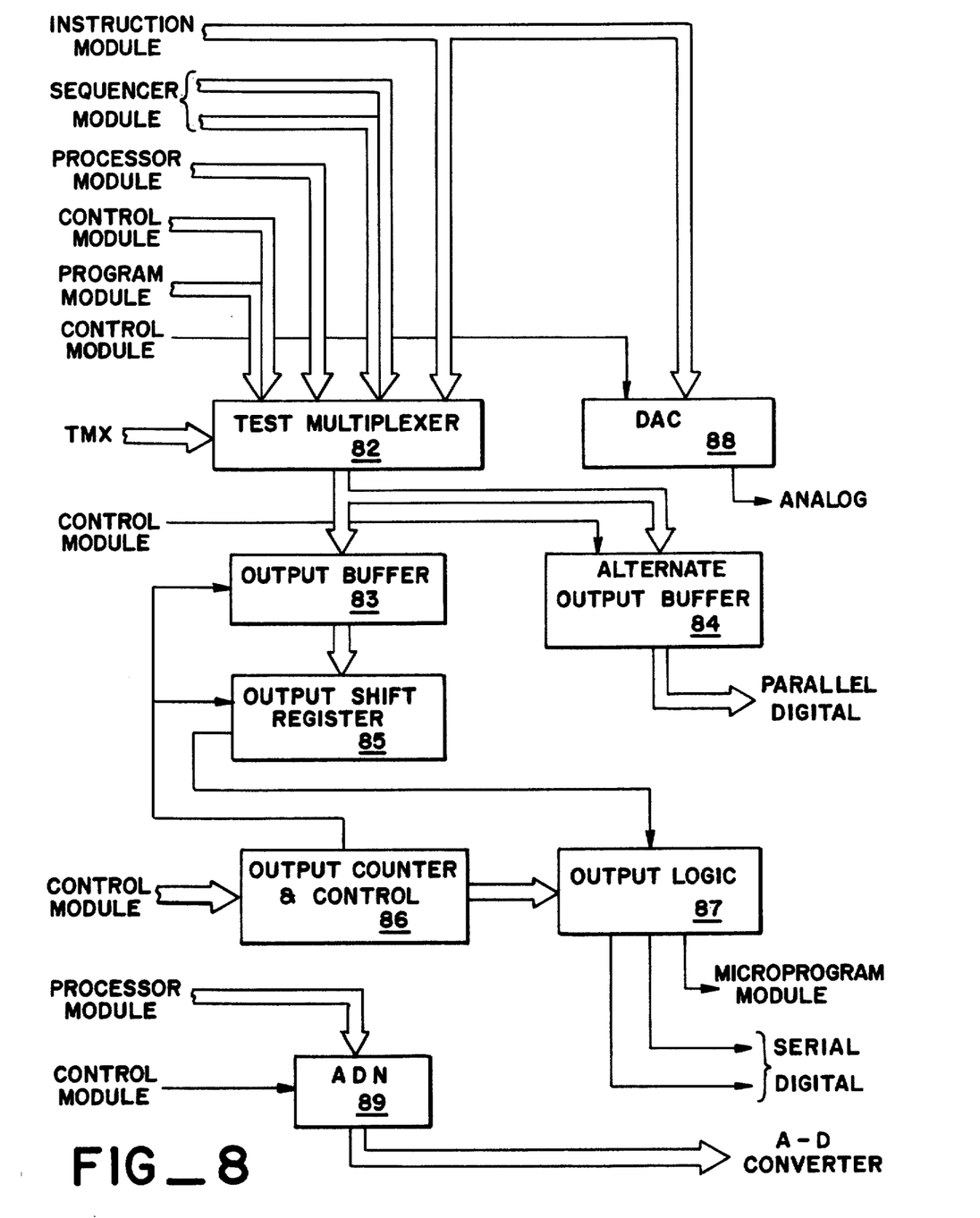
FIG. 8 is a block diagram of the output module of the computer.

The output module 80 is shown in FIG. 8. A test multiplexer 82 is under the control of the TMX field of the microinstruction register 24 and selects either (1) the output of the address multiplexer 46 from the program module 40 concatenated with other test points, (2) the output of the write multiplexer 59 from the processor module 50, (3) the output of the read multiplexer 36 from the instruction module 30, or (4) the output of the control multiplexer 65 concatenated with the output of the subroutine multiplexer 68 from the sequencer module 68. The test multiplexer 82 is in turn connected to an output buffer 83 and an alternate output buffer 84.

The output buffer 83 and its associated output shift register 85 are under the control of an output counter and control circuit 86 which controls the loading of the output shift register from the output buffer and the serial unloading of the output shift register. The output counter and control circuit 86 is in turn controlled by the MICRO-ORDER field of the microinstruction register 24 via the control module 90. The serial output is connected through an output logic circuit 87 under control of the output counter and control circuit 86 to a line or lines to provide a serial digital output. The output logic circuit 87 also provides the microprogram module 20 with an output interrupt signal to indicate the output buffer 83 is ready for the next output interrupt.

The alternate output buffer 84 is loaded by a signal from the MICRO-ORDER field of the microinstruction register 24 via the control module 90 and is connected to provide a parallel digital output for high rate devices. A digital to analog converter (DAC) 88, under the control of the MICRO-ORDER field via the control module 90, receives its input from the read multiplexer 36 of the instruction module 30 and provides an analog output to drive analog devices.

Returning now to FIG. 2, a priority sub-module located in the microprogram module 20 has a priority logic circuit 29 and the combinational register 27. The priority logic circuit 29 receives the interrupt inputs from the input module 70 (INPUT), the output module (OUTPUT), the control module (FETCH), the unbuffered cycle lookahead from the microinstruction register 24, and the output of the STATUS latch (SSTAR) from the combinational register 27, and determines whether the computer should be executing an instruction, fetching an instruction or processing an interrupt. When more than one of these conditions is pending, the action taken is determined by the priority logic circuit 29.

Whenever a new instruction must be fetched from program memory 42 of the program module 40, since the three least significant bits (CYC) of the current microinstruction are unbuffered, the "fetch" condition is detected as soon as the microinstruction word containing it is accessed. Thus the addressing portion of the fetch takes place before any other operation indicated by the microinstruction, and the fetch can take place on the next cycle of the program memory 42 concurrently with any other indicated operation.

CYC also may indicate a condition called END which is used to determine when the computer may be interrupted. When a user program instruction is begun, the computer enters the microprogram segment associated with that particular instruction. In most cases this segment will make use of several registers in the register file 51 of the processor module 50 for local bookkeeping operations. This data is discarded at the end of the segment, and the next program instruction may use the register file 51 for a different set of bookkeeping operations. To prevent data in the register file 51 from being lost, the interrup subroutine of the microprogram can interrupt the processor module 50 only when the END condition occurs. The last microinstruction associated with each macroinstruction (program instruction) contains such an END condition so the pending interrupt may be acted upon when instruction processing is complete. Under these circumstances an interrupt address is generated by the control module 90 and is selected by control multiplexer 65 of the sequencer module 60. On the next computer cycle execution switches to the alternate register 63.

The inputs to the combinational register 27 are from the priority logic circuit 29 to determine CMX and whether an input or output interrupt exists, and from STATUS condition from the input module 70 which, together with the bank bit, selects the one-half of memory which contains the microdiagnostic routines.

Figure 9:
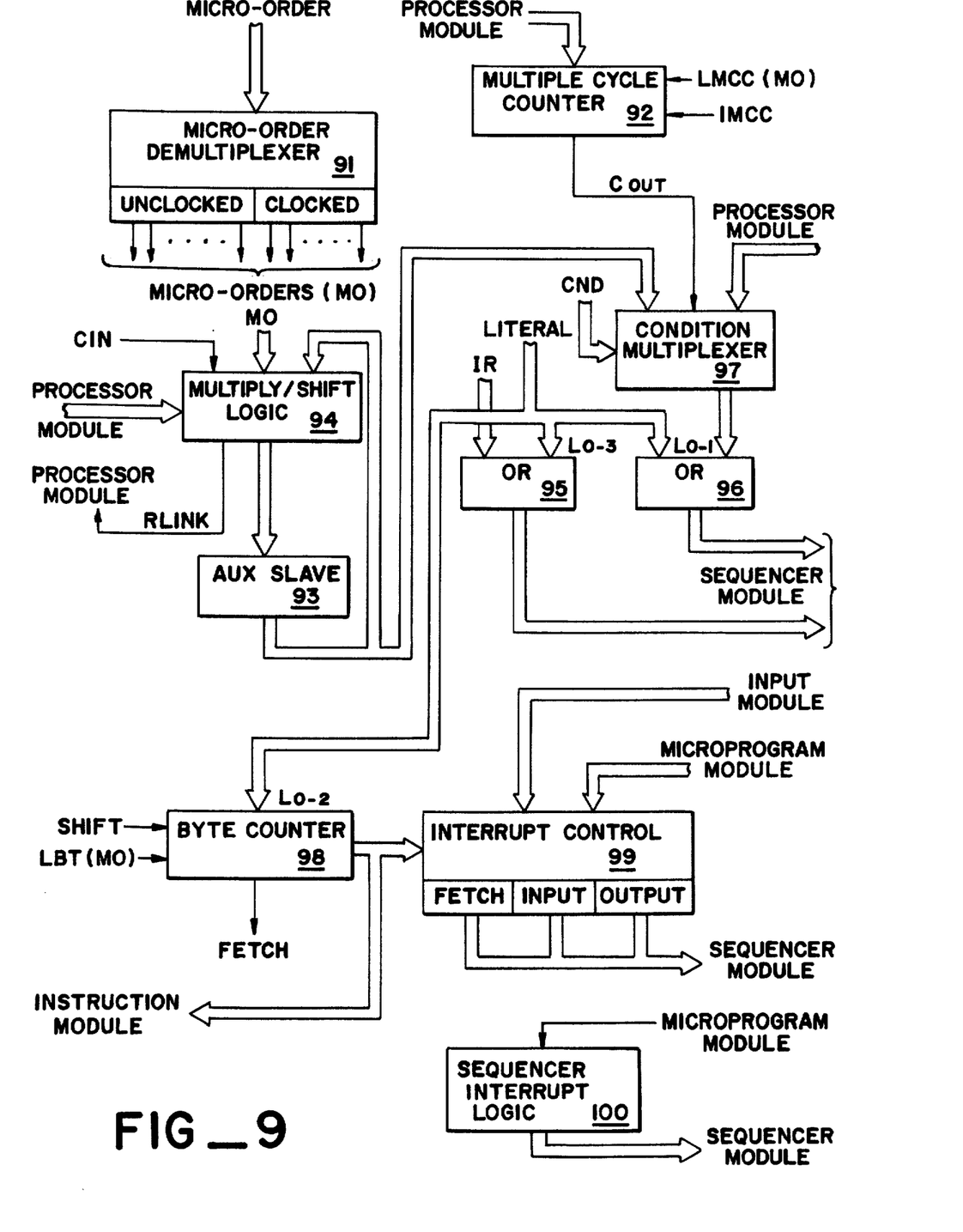
FIG. 9 is a block diagram of the control module of the computer.

The last module to be described is the control module 90 shown in FIG. 9 which contains the hardware to perform several distinct and unrelated functions. A micro-order demultiplexer 91 outputs a number of signals which enable various conditions within the computer. These signals are produced by the MICRO-ORDER field of the microinstruction register 24 since they are used less frequently than the signals which are assigned their own unique control fields in the microinstructionn register. They do not have to be explicitly specified for each microinstruction and no two of them must be activated at the same time, thus saving several bits in each microinstruction, i.e., instead of 32 bits for 32 signals, only 5 bits are required. The signals from the MICRO-ORDER field include load multiple cycle counter (LMCC), load byte counter (LBT), address register transfers in the sequencer module 60 as discussed supra, bit manipulations involving the slave register 57 in the processor module 50 as used by the multiply microroutine, and several others. They are divided into two classes — clocked and unclocked.

The unclocked signals, when selected, become active as soon as demultiplexer decoding of the MICRO-ORDER field is complete and remain so until the next clock pulse places a new microinstruction into the microinstruction register 24. These signals drive circuitry which is itself clocked, such as J-K flip-flops, and thus any decoding spikes from the micro-order demultiplexer 91 have no effect and are assumed to have settled out before the next clock pulse. Conversely, clocked signals drive combinational circuitry directly. Since decoding spikes are undersirable in this case as they might cause errors, they are avoided by clocking the micro-order demultiplexer enable line. Clocked signals are thus active only during the clock pulse following the one in which they were loaded into the microinstruction register 24.

A multiple cycle counter 92 allows control of cyclic processes such as multiplying and shifting, is loaded with the output of the function multiplexer when LMCC (unclocked micro-order signal) is active, and is incremented whenever the IMCC field of the microinstruction register 24 is active. End of process is indicated when a carry out of the counter ($C_{OUT}$) is detected and a conditional transfer is made on the basis of this condition.

Two groups of logic appear in the control module 90 which use "internal conditions"as inputs. The first of these groups is derived from an auxiliary slave register 93 which is used to shift bits in the multiplier/shift logic 94 during multiplication. All internal conditions used by this logic are outputs of the micro-order demultiplexer 91 and the CIN field of the microinstruction register 24 which produce the carryin signal for serially entering bits via the ALU 53 into the slave register 59.

The other group of logic performs two functions. The first is the ORing of part of the LITERAL field from the microinstruction register 24 with either the IR field of the instruction register 34 or certain internal conditions which are treated as a two-bit field. The other is to choose one of these internal conditions which are derived from the auxiliary slave register 93, the multiple cycle counter 92 and the processor module 50. Selecting pairs of these signals in the computer is accomplished via a condition multiplexer 97 addressed by the CND field of the microinstruction register 24 and provides conditional transfers based upon the conditions selected.

A byte counter 98 and associated interrupt control logic 99 are used in the loading of the instruction register 34, and in the transfer of data from the input shift register 72 to locations in the input buffer of the data memory 44 as determined by the bits from the input code register 78, respectively. The byte counter 98 is loaded from the three least significant bits of the LITERAL field when enabled by the micro-order signal LBT from the micro-order demultiplexer 91.

Output from the byte counter 98 goes to the instruction multiplexer 32 and the interrupt control logic 99. The byte counter 98 also notifies the priority logic 29 of an impending FETCH, and when the FETCH condition is enabled by the priority logic the interrupt control logic 99 generates the microaddress of a fetch routine which is input to control multiplexer 65. Whenever the byte counter 98 indicates four bytes are empty in the instruction register 34 (due to shifting), or three bytes are empty and the SHIFT condition is active, the FETCH signal becomes active. This signal is processed by the priority logic 29 in conjunction with the CYC field of the next microinstruction. When the CYC field indicates either an END or a FETCH enabling condition in conjunction with the FETCH signal and the absence of a higher priority interrupt, the interrupt control logic 99 generates a microaddress which is selected by the control multiplexer 65 and causes the computer to enter a FETCH processing microroutine.

The interrupt control logic 99 also generates microaddresses for input and output microroutines when the priority logic 29 processes the appropriate interrupt.

The instruction set for the computer is organized around bytes four-bits in length even though program and data memory words are several bytes long. The number of bytes used in a given instruction is dependent on the amount of information required and is fixed by the microprogram associated with that instruction. Length may be as short as one byte or of an indefinite length for an arithmetic string depending on the complexity of the arithmetic expression involved.

The variable length instruction scheme allows memory space to be conserved by using the minimum number of bytes required for each instruction rather than multiples of a fixed word length. If an instruction occupies less than a full computer word, the following instruction will begin in the first unused byte of the word and, if necessary, continue to the next full word. Since the computer is word-addressable rather than byte-addressable in order to minimize the size of instruction address fields, it is not possible to transfer program control via a branch instruction to an instruction which begins in the middle of a word. This condition is remedied by the insertion of NO-OP instructions until the instruction to be tranferred to begins in the first byte of a word, the insertion being accomplished automatically by a program compiler.

The actual field formats of each instruction, excluding the opcode (which is used directly as an address to the microprogram ROM 22 and thus must appear at the beginning of an instruction), are determined entirely by the microprogram, making the number and placement of the fields entirely arbitrary.

Since a single byte is used as an opcode, the number of basic opcodes is fixed by the hardware as sixteen. However, under microprogram control additional fields (called variant fields) may be used to modify the opcode and thus extend the instruction set. In the general case the variant operations of a single opcode need not be related at all, and thus no flexibility is lost in the possible instruction set by restricting the number of basic opcodes to sixteen.

The sixteen basic types of instructions can be subdivided into several classes. Three instructions allow data transfers between the general registers and memory. All arithmetic operations derive their operands from the general registers which reside in the first sixteen locations of the data memory 44. Thus, general registers may be addressed by a single byte rather than three bytes (for a 12-bit address register), allowing an appreciable storage saving in the case of arithmetic expressions.

The polish string instruction allows a sequence of operations of indeterminate length to be performed using the contents of the general registers. Any arithmetic expression that can be expressed as a chain calculation is valid. Intermediate results are accumulated in the slave register 57.

Arithmetic operations, such as addition, subtraction, mulitplication, incrementing, decrementing, etc., shifting operations, and logical operations such as ANDing and ORing of two words are available. Also several types of branching operations are available, including both unconditional and conditional branching (IF instructions) as well as subroutine branch and return operations. Finally, various types of indexed data transfers are available.

Figure 10:
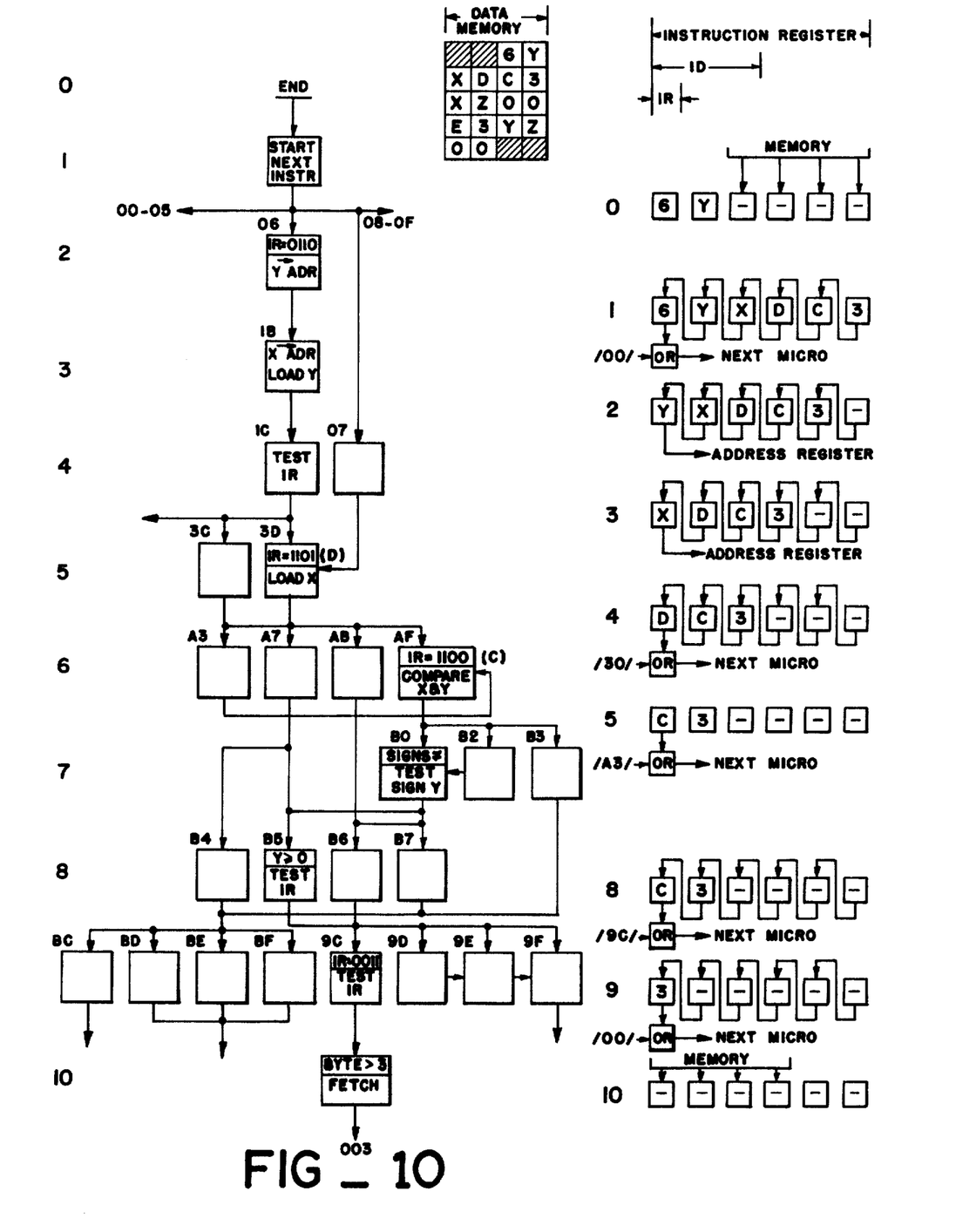
FIG. 10 is an illustration of instruction execution by the computer.

Microprogram execution of instructions will be illustrated by reference to the IF instruction. Referring now to FIG. 10, it is desired to set Z to the smaller of X and Y, where X, Y and Z specify general registers, or, IF X < Y, THEN Z = X, ELSE Z = Y. The assembled instruction would appear in program memory 42 as a string of bytes as illustrated, where 6 = IF opcode, D = IF test, C= condition to be tested, 3 = register tranfer opcode, O = NO-OP. A flow chart of the implementing microprogram is shown at the left and the consequent instruction register activity is shown at the right. The instruction numbers correspond to the flow chart level numbers where the instruction is executed. The boxes in the flow chart represent microinstructions, microaddresses in hexadecimal are shown above each box, and, if a logic condition is required to invoke a particular microinstruction, it is shown underlined at the top of the box.

Each instruction is responsible for emptying the instruction register of that instrution's string and starting the next instruction. This is done by ORing the LITERAL $00_{16}$ with the most significant byte of the instruction register. When an instruction is ending, the terminating microinstruction's LITERAL is always $00_{16}$; therefore, the OR of this LITERAL and the opcode is always the opcode. This forces a branch to one of the first 16 locations in the microprogram which contains the first step for that instruction. The IF will actually start with its opcode 6 shifted out and the address of the general register Y at the left of the instruction register. The microinstruction transfers the address of Y to the memory address register and a memory cycle begins, placing the actual number Y in one of the file registers. Again the instruction register shifts, the address of X appears and is transferred to the memory address register. The sequence 06 - 1B - 1C are common to all instructions which use two operands.

At this point 16 different things could happen. In the example the byte following X is a D (binary 1101). This means that the two preceding bytes have specified registers whose contents are to be compared. If X were followed by C, it would mean that location X contains a number to be compared with a number Y, as opposed to the number in location Y. The other 14 possibilities specify arithmetic operations. To establish what action is to occur, the byte following X is tested against LITERAL $30_{16}$, and, as the outcome is 3D, a branch takes place in the microprogram. The microinstruction in 3D places the contents of X in one of the file registers.

3D can be reached by another route when the first byte of an instruction is 7 (and the microprogram sequence begins at 07). This instruction compares the contents of a register against 0, and is used frequently enough to justify its own shorter (two bytes), faster format. The separate sequence saves program memory space and time, and illustrates the type of optimization possible.

The byte in the string after the D is a C (binary 1100), which is again tested. This byte specifies the kind of comparison to take place — equal, unequal, greater than, less than - and what to do if the comparison succeeds — branch immediately, branch after incrementing or decrementing a register, or execute another instruction (the THEN part of the IF instruction). The test is against LITERAL A3 (binary 1010 0011), which effectively masks the lower two bits of the byte and tests only the upper two bits to establish comparison. Here the test of C with A3 yields AF: the microinstruction in location AF calls for the "less than" instruction. Byte C remains in the instruction register so that its other two bits can be tested in due time. Since for the purposes of this example the comparison shows that X is indeed less than Y, the microprogram proceeds to check their signs, and then to look at the other two bits of C by a test against LITERAL 9C to find out what to do about it.

The remainder of the microprogram sequence is not shown, but in the long run it sets a register Z with the contents of register X as specified in the programmer's instruction. The last byte it sees in the immediate sequence is a 3, which is the opcode calling for the contents of one register to be moved to another register; however, before it knows which two registers are involved, it has to fetch more of the instruction from the program memory. This fetch is necessary because the byte counter is greater than 3 and is signaled by a FETCH from the CYC (cycle lookahead) field of the microinstruction; and it is possible because the relation between X and Y, which previously occupied part of the file register, has been determined and they may now be overlaid with new instruction bytes.

Therefore, the present invention provides a variable architecture digital computer where the most complex design features are concentrated in the microprogram which controls the instruction set, input/output and diagnostic tests. Developmental changes in the software, thus, don't affect the hardware, and the variable instruction length provide maximum flexibility with minimum memory space which is so important in aerospace applications.

What is claimed is:

1. A variable architecture digital computer comprising:
 a microprogram module containing a plurality of microprogram routines;
 an instruction module having an instruction register divided into a plurality of bytes in excess of the number of bytes of an instruction word, said instruction register capable of shifting the contents of said register in byte increments under the control of said microprogram routines;
 a program module having a memory divided into a program memory and a data memory, said program memory being the source of said instruction words;
 a processor module to perform operations on data from said data memory and said instruction register under the control of said microprogram routines;
 means for sequencing said microprogram routines;
 means for inputting and outputting data to and from said data memory under the control of said microprogram module; and
 means for controlling the operations of each element of said computer under the control of said microprogram module.

2. A computer as recited in claim 1 wherein said microprogram module comprises:
 a read only memory (ROM) in which said mirocprogram routines are contained, the microinstructions of said microprogram routines being addressed by said sequencing means; and
 a microprogram register to which the particular microinstruction of the microprogram routine being executed is transferred from said ROM, said microprogram register having outputs to all the modules of said computer to drive medium scale devices in each of said modules.

3. A computer as recited in claim 2 wherein said instruction module comprises:
 an instruction multiplexer under the control of a byte counter in said controlling means, said instruction multiplexer having as an input a concatenation of bytes from said instruction register with said instruction word from said program module, said concatenation being a function of the number of empty bytes in said instruction register resulting from said shifting as determined by said byte counter, and having as an output said concatenation to said instruction register; and
 a read multiplexer which has inputs from said data memory, said instruction register and said processor module, and which outputs to said processor module, said data memory and said outputting means as determined by the particular microinstruction being executed.

4. A computer as recited in claim 3 wherein said processor module comprises:
 a register file having a plurality of registers, the input to said register file being from said read multiplexer, the particular register of said register file being accessed being determined by said particular micorinstruction in said microprogram register;
 a slave register which acts as an arithmetic accumulator when enabled by said particular microinstruction in said microprogram register;
 an arithmetic logic unit (ALU) which performs arithmetic and logic functions upon two operands, one operand from said register file and the other operand from said slave register, the particular function to be performed being determined by said particular microinstruction in said microprogram register;
 a function multiplexer which accepts the output of said ALU, a literal word from said particular microinstruction and the output of said data memory as determined by said particular microinstruction, and which provides an input to said slave register; and
 a write multiplexer which has inputs from said inputting means, from an analog-to-digital converter, from said register file and from said function multiplexer and provides an output to said data memory and to said outputting means.

5. A computer as recited in claim 4 wherein said sequencing means comprises:
 a control multiplexer which addresses the next microinstruction to be transferred from said ROM to said microprogram register for execution under the control of said microprogram;
 means for incrementing the output of said control multiplexer;
 means for selecting the source of an address to input to said control multiplexer, said selecting means being under the control of said microprogram;
 means for interrupting a microprogram routine when an input/output microprogram routine is required, and for returning to said interrupted microprogram routine when said input/output microprogram routine is completed; and
 means for entering a microsubroutine within said microprogram routine, and for returning to said microprogram routine.

6. A computer as recited in claim 5 wherein said inputting means comprises:
 means for storing serial digital input data;
 means for extracting a destination in said data memory for said input data; and
 means for transferring said input data to said data memory in parallel.

7. A computer as recited in claim 6 wherein said outputting means comprises:
 means for converting digital data to analog data for outputting;
 means for storing parallel digital data;
 means for shifting said parallel digital data as serial digital data for outputting; and
 means for providing a parallel digital output from said parallel digital data.

8. A computer as recited in claim 7 further comprising means for performing real-time diagnostic routines to determine whether logical faults are occurring in said computer during real-time processing.

* * * * *